Sept. 13, 1938.  G. H. HENRIETTA  2,130,130
REGISTER
Filed Jan. 19, 1933  3 Sheets-Sheet 2
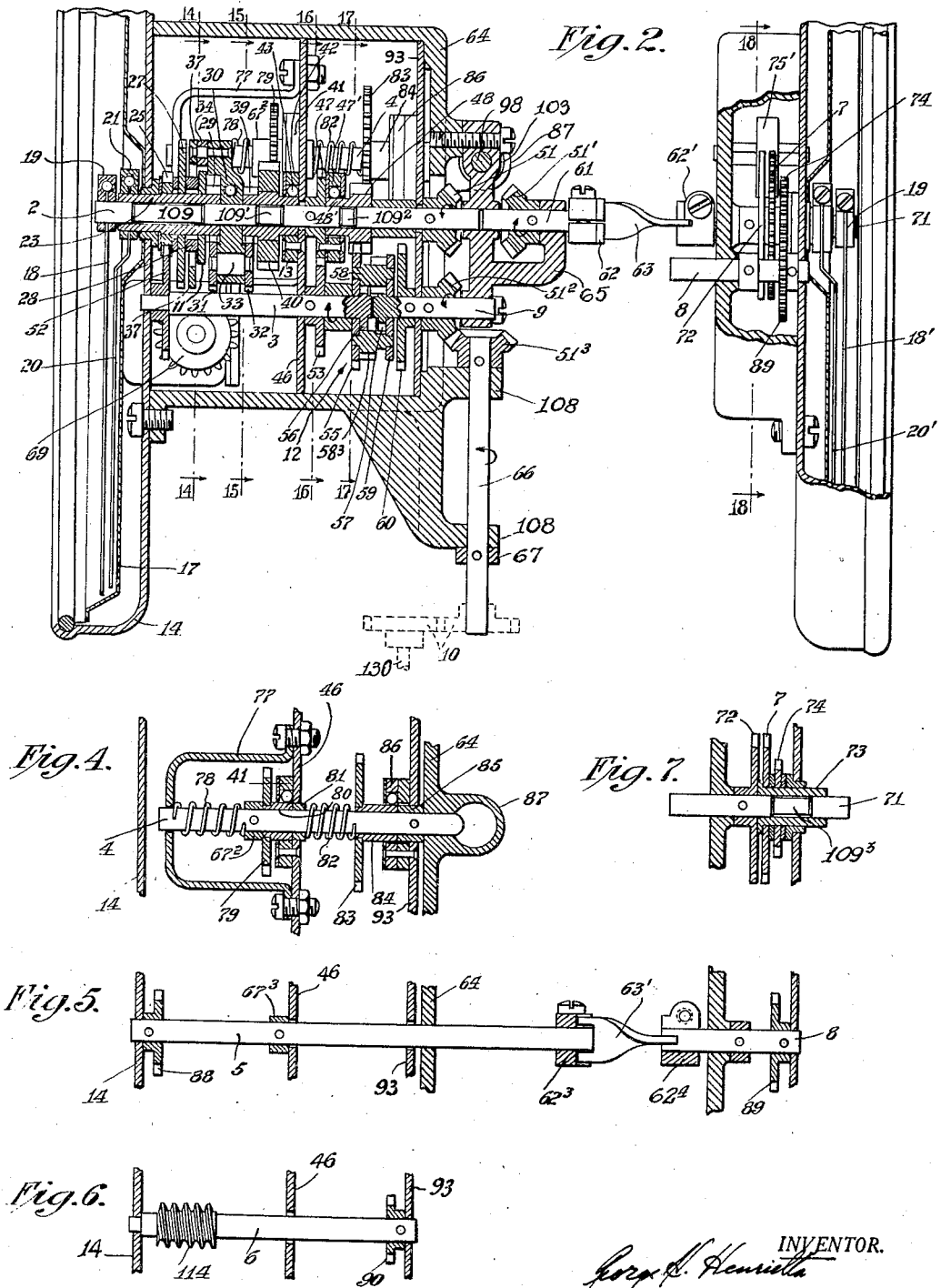
INVENTOR.
George H. Henrietta
BY
ATTORNEYS.

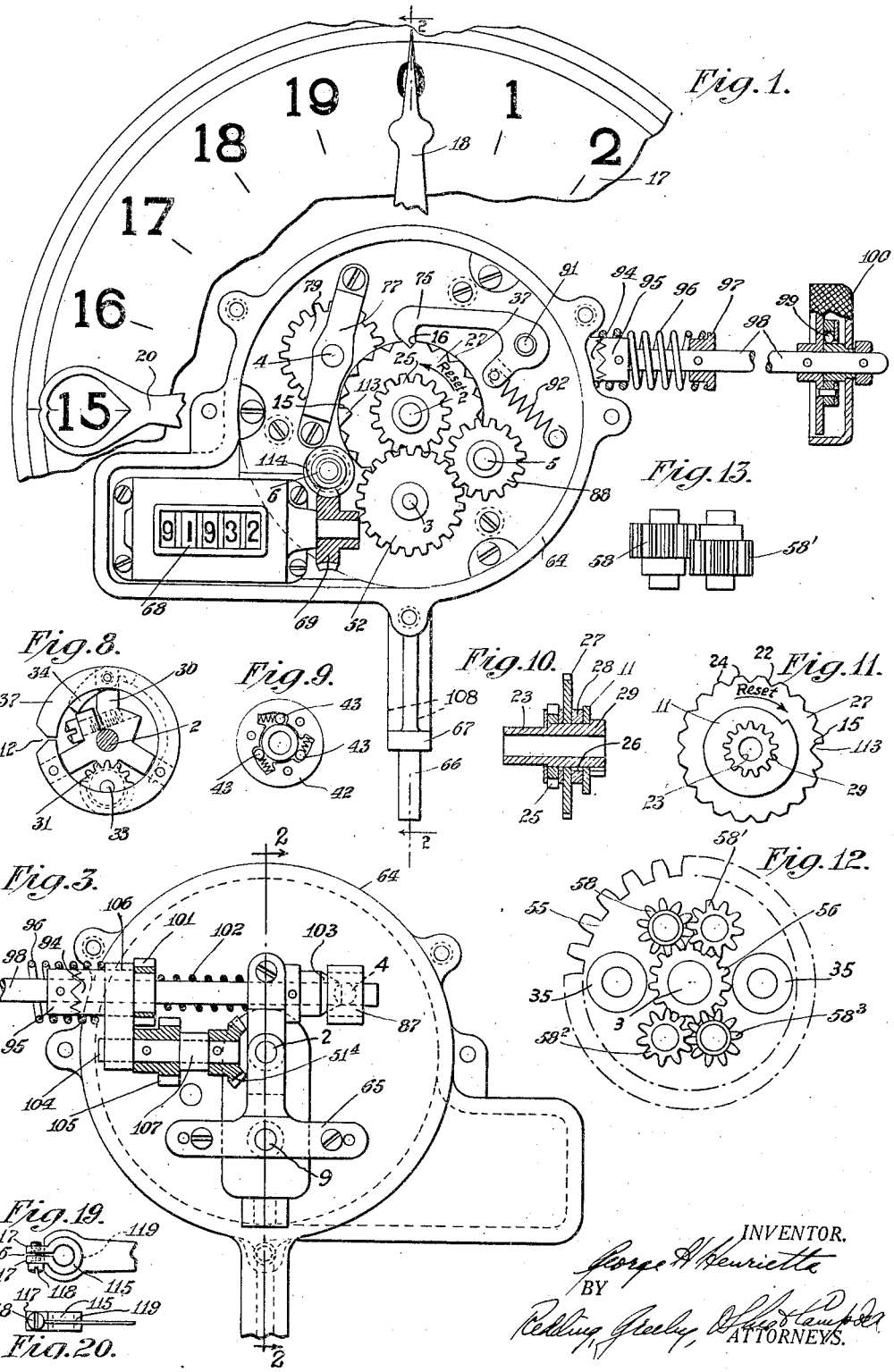

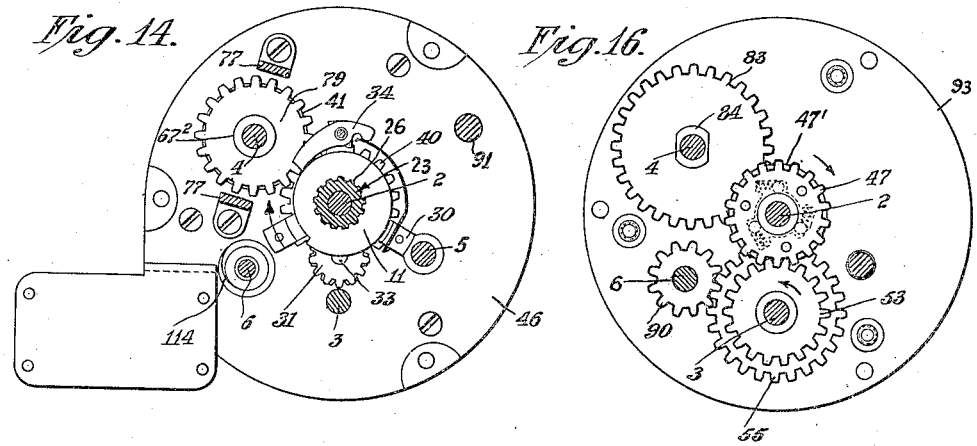
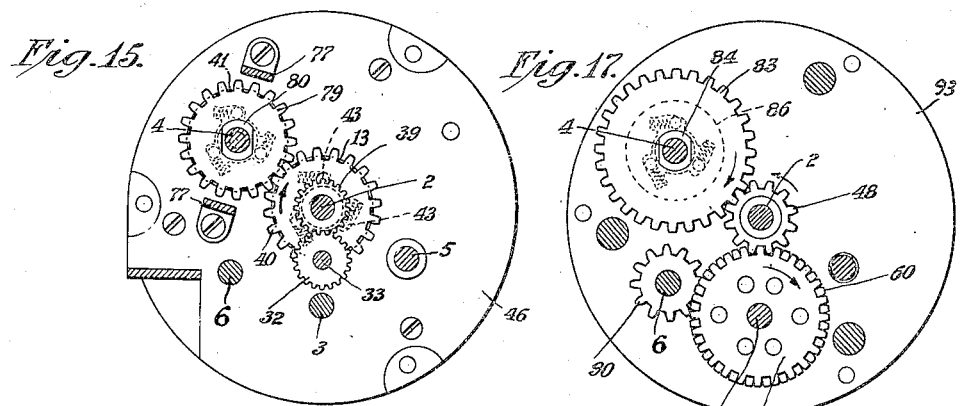
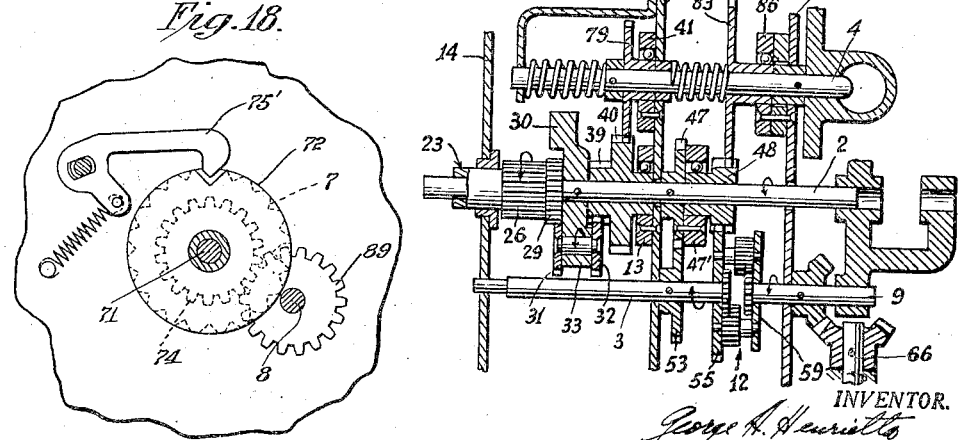

Patented Sept. 13, 1938

2,130,130

UNITED STATES PATENT OFFICE 2,130,130

REGISTER

George H. Henrietta, Torrington, Conn.

Application January 19, 1933, Serial No. 652,454

26 Claims. (Cl. 235—144)

The present invention relates to registers and embodies, more specifically, an improved register construction by means of which accurate functioning of the register mechanism is insured under all conditions of operation.

In register mechanisms now available, lightly adjusted friction clutches are utilized in the driving trains in order that resetting operations may be accomplished by manually slipping the clutches through which movement from the external power source is transmitted to the indicating elements. Regardless of the character of these friction connections, a degree of slippage exists therein which causes an error in the registration of the quantity of substance being dispensed as determined by the connection to the external power source which may be a fluid meter.

These mechanisms are also capable of manipulation to consistently over indicate, regardless of the character of the clutches and associated mechanism. For example, the inertia of the driven mechanism may be utilized to carry the indicating elements beyond the correct indicating position by shutting off the flow of fluid abruptly. The ingenious dispenser also is able to find numerous other methods of effecting incorrect registration.

Certain forms of liquid meters have been designed heretofore which function consistently and with a well sustained accuracy when operated under a definite pressure or head for which they are calibrated or adjusted. The desirability of accurately indicating the meter performance independently of a functional failure of indicating mechanism used in combination therewith will be readily apparent. Furthermore, it is highly desirable that the meter performance be accurately indicated regardless of the skill with which the means controlling the meter and indicator operation are manipulated during operation thereof.

Moreover, when slip-friction clutches are included in the driving train of a register, it is evidently feasible to manually move the indicating hands independently and at will in either direction to indicate any amount within the capacity of the device. Whereas with the improved construction here revealed when positively coupled with an external mechanism, except through the application of destructive forces, there can be no progressive movement of the hands other than transmitted in the desired manner as a visual evidence of definite accomplishment, and there can be no retrograde movement other than through the operation of the means provided for that purpose.

In order that a registering mechanism may be provided which is capable of being reset and which positively prevents errors in registration by reason of improper functioning of the registering mechanism, the present invention has been designed, enabling the elimination of all friction clutches or designedly separable couplings in the driving train between the meter and the register hands. The invention proposes to substitute a positive train of gears between such elements and embody in such train a mechanism by means of which a resetting operation may be accomplished without disturbing the positive nature of the connection between these elements at any time while maintaining the drive shaft free from torque during a resetting operation.

An object of the present invention, accordingly, is to provide a register mechanism of the resetting type wherein the elements are of such construction that an accurate functioning of the mechanism takes place under all conditions.

A further object of the invention is to provide register mechanism wherein friction clutches or designedly separable couplings are eliminated in the driving train between the meter and the register hands, such mechanism comprising elements which are positively connected under all conditions of operation.

A further object of the invention is to provide an improved register mechanism which is adapted to connect register indicating hands positively with a source of power which may be driven by a fluid meter, a resetting mechanism being incorporated therein by means of which a reverse movement of certain elements of the register driving train may be effected without disturbing the positive connection between the indicating hands and external source of power.

Further objects, not specifically enumerated above, will be apparent as the invention is described in greater detail in connection with the accompanying drawings showing for purposes of illustration one embodiment which my invention may assume in practice.

In these drawings,—

Figure 1 is a view in front elevation, partly broken away and in section through a register mechanism constructed in accordance with this embodiment of the present invention, the plane of the section being taken rearwardly of the dial case of Figure 2 to illustrate the justifying mechanism, as well as the disposition of the shafts constituting the mounting means for the gear trains and associated elements described hereinafter;

Figure 2 is a view in vertical section, taken on line 2—2 of Figures 1 and 3 and looking in the direction of the arrows, this view being in full section at the left and at the right a partial vertical section of the subordinate movement, the partial section being taken in a vertical plane passing through the axis of the jack shaft for driving the quill carrying the multiple indicating hand of the subordinate movement;

Figure 2a is a simplified, somewhat diagrammatic view showing the essential elements of the driving train;

Figure 3 is a view in rear elevation, showing the housing for the principal registering mechanism and the manual resetting means mounted thereon, this view looking to the left as viewed in Figure 2;

Figure 4 is a detail view in vertical section, taken through the axis of the clutch shaft within the housing of the principal mechanism, showing the mounting of the spring biased shaft therein and the clutch mechanism associated therewith;

Figure 5 is a detail plan view in vertical section, showing the assembly of jack shafts for transmitting movement from the multiple hand quill of the principal movement to the multiple hand quill of the subordinate movement;

Figure 6 is a segmental view in partial section, showing the jack shaft for transmitting motion from the register driving mechanism to the totalizer counter;

Figure 7 is a detail assembly view in section showing the subordinate movement, upon the main shaft of which is mounted the quill for mounting the multiple indicating hand;

Figure 8 is a detail plan view of a portion of the justifying mechanism as well as the means for producing a desired reduction of movement between the main indicating hand and the multiple indicating hand, this view also showing a portion of the resetting mechanism;

Figure 9 is a detail view of the ball clutch assembly utilized in the present construction;

Figure 10 is a detail view in vertical section of the quill assembly upon which the multiple indicating hand of the principal movement is mounted;

Figure 11 is a view in front elevation of the construction shown in Figure 10;

Figure 12 is a detail view, on an enlarged scale showing the differential gearing of Figure 2 which constitutes a part of the driving train;

Figure 13 is a detail view on the same scale as Figure 12, and showing two of the planetary pinions of the differential mechanism shown in Figure 12;

Figure 14 is a view in section, taken on line 14—14 of Figure 2, and looking in the direction of the arrows;

Figure 15 is a view in section, taken on line 15—15 of Figure 2, and looking in the direction of the arrows;

Figure 16 is a view in section, taken on line 16—16 of Figure 2, and looking in the direction of the arrows;

Figure 17 is a view in section, taken on line 17—17 of Figure 2 and looking in the direction of the arrows;

Figure 18 is a view in section, taken on line 18—18 of Figure 2 and looking in the direction of the arrows;

Figure 19 is a plan view of a clamp and indicating hand structure, constructed in accordance with the present invention, and Figure 20 is a view in side elevation, showing the clamp structure of Figure 19.

The illustrative embodiment of my invention is described in connection with mechanism for registering the quantity of gasoline or similar fluid metered by a metering mechanism of common design and the hands of the registering mechanism are actuated in such fashion that a unit volume say, for example, one gallon, causes a complete clockwise rotation of one hand of each pair in front of suitably graduated dials while the mating hand is moving in the same rotational direction from one graduation to the next highest in order. Since meters are frequently used in such fashion that it is desirable to indicate the operation thereof in opposite directions, the present invention will be described in connection with a registering mechanism termed the principal movement and an auxiliary registering device which is displayed in the opposite direction which will be termed the subordinate movement. These two movements will function simultaneously and the subordinate movement is driven by the principal movement in such fashion that identical indications are displayed by both movements at all times.

With reference to Figure 2, the registering mechanism is driven by a vertical drive shaft 66 which is journaled in bosses 108, formed upon the register case 64. Power is supplied to shaft 66 from a meter or other mechanism through gears indicated in dot and dash lines at 10 and one of which gears is fixed to a shaft 130 which may be taken to represent a meter spindle. A mitre gear 51³ is secured to the upper end of shaft 66 and a collar 67 is suitably secured to the shaft below the lower boss 108 in order that shaft 66 may be properly mounted.

Within the register case is journaled a shaft 9 upon which a mitre gear 51² is secured, gear 51² being engaged and driven by mitre gear 51³. A jack shaft 3 is coaxial with shaft 9 and is driven thereby through a differential mechanism 12 shown in Figures 2 and 12. This differential mechanism includes a gear 55 (Figure 12) upon which differential planetary pinions 58, 58′, 58², and 58³ are journaled. Gear 55 is journaled upon jack shaft 3 (Figure 2), the latter having secured thereto a driven differential sun pinion 56 (Figures 2 and 12). A cooperating driving differential sun pinion 57 (Figure 2) is secured to shaft 9 and the sun pinions, of course, engage the planetary pinions as illustrated in Figure 12, the sun pinion 56 engaging planetary pinions 58 and 58³ while sun pinion 57 engages planetary pinion 58′ and 58². A side plate 59 is journaled upon shaft 9 and is suitably connected with gear 55 by means including the bosses 35 (Figure 12) for rotation therewith and like gear 55 serves as a mounting in which the planetary pinions are journaled. Gear 55 is normally anchored by a gear 48 in order that reversed motion may be transmitted between the shafts 3 and 9 by the sun and planetary pinions of the differential mechanism. The gear 48 has one-half as many teeth as gear 55 so that when the latter is driven by gear 48 during resetting, as hereinafter explained, the gear 55 will be driven at one-half the speed of gear 48. The sun pinions 56 and 57 are of the same diameter and consequently when gear 55 is held by gear 48, as occurs during the indicating operation, the shaft 3 is rotated at the same speed as shaft 9 but in the opposite direction.

A gear 53, secured to shaft 3, engages a gear 47 of like diameter which is secured to a main indicator shaft 2 in order that the rotation of shaft 3 may be transmitted to shaft 2 in the same ratio. Shaft 2 is reduced in diameter at the points 109, 109' and 109² for the purpose of decreasing bearing surface and to provide surfaces to be packed at the time of assembly with lubricant grease of suitable consistency. Shaft 71 (Figure 7) is similarly formed at 109³. The drive from main shaft 2 of the principal movement to the coaxial main shaft 71 of the subordinate movement is effected by means including a short section of shaft 61 journaled in a projecting bracket 65 of register frame 64 and located between and coaxial with shafts 2 and 71. The shaft 61 has fixed thereon a mitre gear 51' located adjacent a like mitre gear 51 fixed on shaft 2; and these gears 51' and 51 are operatively connected by a mitre gear 51⁴ (Fig. 3) fixed on one end of a stub shaft 104 journaled in bosses 106 and 107 of register case 64 and disposed at right angles to shafts 2 and 61. Inasmuch as these mitre gears will cause shafts 61 and 71 to rotate in a direction reverse to the direction of rotation of shaft 2, each of the indicating hands of the principal and subordinate dials will turn during indicating movement, for example, in a clockwise direction as viewed from the front of each. Between the shafts 61 and 71, a coupling is provided which is a development of an Oldham coupling comprising two similar split clamps 62 and 62' which are secured to the respective shafts 61 and 71. Each clamp is formed with a radial slot at right angles to the split thereof, the slots receiving a twisted distance piece 63, whereby the assembly and relative timing between the principal and subordinate movements is facilitated. This coupling transmits a constant angular velocity between the movements regardless of the degree of accuracy of alignment thereof.

Unit indicating hands 18 and 18' are clamped to the respective shafts 2 and 71 by means of clamps 19 as described in greater detail hereinafter in connection with Figures 19 and 20.

In order that proper movement of the multiple indicating hands with respect to the unit indicating hands may be attained, a reverted train drive is provided. It includes a spider 30 which, for convenience in assembling, is clamped to the shaft 2 to revolve. Upon the spider 30 is journaled a shaft 33 to which planetary pinions 31 and 32 are fixed. Planetary pinion 31 engages a gear 29 of equal pitch diameter which is integral with the externally fluted portion 26 of a sleeve or quill 23 (Figs. 2a and 14) upon which a multiple indicating hand 20 is secured by means of a clamp 21 similar to clamp 19 (Figures 2 and 19). Planetary pinion 32 engages a sun pinion 39, in the bore of which the main shaft is freely rotatable, and pinion 39 is permanently held against rotation in a clockwise, or indicating, direction by means of a ball clutch assembly 13, including clutch balls 43 and a ball clutch cam plate 42 (Figure 9), and is normally held against rotation in a resetting direction by another ball clutch assembly 41 of identical design engaging the hub of a gear 79 which meshes with a gear 40 secured to pinion 39. The planetary pinion 32 is provided with twenty teeth while the sun pinion 39 is formed with nineteen teeth. This affords a twenty to one reduction between the unit shaft 2 and the quill 23. The sun and planetary gears that constitute this reverted train are incapable of independent movement as they are in continual positive engagement.

Secured to portion 26 of the quill 23 is a gear 25 which engages with an idler gear 52 journaled upon shaft 3 (Figures 1 and 2). Idler gear 52 engages a gear 88 (Figures 1 and 5) which is secured to jack shaft 5 for transmitting the motion of quill 23 to the subordinate movement. A shaft collar 67³ mounts shaft 5 in accurate driving position at all times and a shaft 8 of the subordinate movement is driven by shaft 5 through a coupling 63', 62³ and 62⁴, similar to the coupling between shafts 61 and 71 for the units indicating mechanism. Upon shaft 8 is secured a gear 89 which meshes with a gear 74 upon a quill 73 (Figure 7). The quill 73 is journaled upon shaft 71 and carries a multiple indicating hand 20'.

The foregoing mechanism constitutes the main register mechanism by means of which units and multiples may be indicated upon both the principal and subordinate dials. The foregoing structure will be seen to constitute a positive driving connection between the power shaft 66 and the indicating hands, friction clutches and similar mechanisms being completely eliminated therefrom.

In order that each hand of the principal and subordinate movement may be controlled to indicate definitely the operation performed, a justifying mechanism is provided for causing the hands to be moved to definite agreement with dial graduations, regardless of the backlash present in the driving train. This is of particular importance not only during counting but also during the resetting of the hands to zero. The error of indication to be compensated for is due to backlash and multiplied by reason of the considerable length of the indicating hands.

With reference to Figures 1, 2, 8, 10 and 11, the spider 30 is shown as having a justifying ring 37 secured thereto. This ring is formed with a deep notch 112 (Figure 8) whereby the position of a disc 27, fixed to quill 23, and consequently the hand 20 may be relatively justified to the hand 18 each time the shaft 2 makes a complete rotation. A detent 75 (Figure 1) is journaled at 91 and urged against the periphery of the justifying ring 37 by means of a spring 92. The detent 75 is sufficiently wide to span the justifying ring 37 and the disc 27.

Ring 37 is slightly greater in diameter than disc 27 and the notch 112 is so shaped that when engaged with the detent 75 the rotation of the ring in either direction will lift the detent from the notch 112 to ride upon the periphery of the ring. Disc 27 is formed with spaced notches 22 in its periphery corresponding in number and angularity with the graduations of a dial 17 within dial case 14, the portions of the periphery between the notches, as shown, comprising approximately one-half of the periphery of the disc and constituting lands between the notches.

Upon the completion of a rotation of the ring 37 the detent is urged into the notch 112 and any notch of disc 27 that has been moved into approximate alignment with notch 112. If the unit indicating hand is stopped at a zero indication upon the completion of delivery of any unit volume that is being registered the pressure of the detent in a corresponding notch of the disc 27 takes up any slack that exists in the driving train and causes the multiple indicating hand to register exactly on the graduation for the proper multiple.

At the completion of the resetting phase of an operation the detent 75 enters the notch 112 of the justifying ring 37 and engages a specially formed notch 113 of disc 27 (Figure 11) which corresponds in depth to notch 112 of ring 37, the two notches 112 and 113 being in alignment with detent 75 when the hands 18 and 20 are at zero. Notch 113 is formed in the particular fashion shown with one side wall thereof V-shaped, as indicated at 15 in order that it may serve as a resetting stop with which the cooperating V-shaped face 16 of the detent interlocks to end the resetting operation.

In the subordinate movement (Figure 2) the detent 75', in combination with a disc 72 and disc 7 halts resetting and performs a similar justifying operation to that above described.

Resetting of the mechanism is accomplished by means of a manual reset knob 100 (Figure 1) which is mounted upon a reset shaft 98 by means of a ball clutch 99 which permits rotation of shaft 98 in a resetting direction only. A collar 97 is secured to shaft 98 and serves as a seat for spring 96 which is seated against a boss 106 of the case 64 to urge a conical cam member 103, fixed to shaft 98, to the left (Figure 3) against a bearing bracket 65. A clutch member 94 is formed upon a laterally slidable sleeve which is journaled in boss 106 (Figure 3), a gear 101 being formed thereon. Upon the shaft 98, and bearing against sliding gear 101 is a clutch spring 102 one end of which constantly urges the sleeve carrying clutch member 94 and gear 101 to the left, as viewed in Figure 3 and hence urges the clutch member 94 into engagement with a cooperating clutch member 95 fixed to shaft 98. The other end of clutch spring 102 is seated against an arm of bearing bracket 65. Movement of shaft 98 to the right, as viewed in Fig. 3, causes the conical portion of the member 103 to move into an apertured boss 87 (Figures 2, 3 and 4).

Also upon movement of the shaft 98 to the right, as viewed in Figure 3, sliding gear 101 moves into engagement with resetting gear 105 which is secured to a stub shaft 104, journaled in boss 106 and a boss 107. Mitre gear 51⁴ is secured to stub shaft 104 and, since it meshes with mitre gears 51 and 51' on shafts 2 and 61, the shafts 2 and 61 are thus connected with resetting knob 100 in order that the latter may effect a desired resetting operation.

It is preferred to have shaft 98 stationary during the indicating, or counting, phase of an operation, and it is also preferred to avoid the possibility of the application of excessive resetting force to the detents 75 and 75'. It is for these reasons that the gears 101 and 105 are designed to be normally disengaged as shown in Figure 3, with the gear 101 rotatably mounted on the shaft 98 and driven by that shaft through the medium of the yielding connection 94, 95 during the resetting phase of an operation.

In addition to the direct transmission of force between the resetting knob 100 and the shafts 2 and 61, it will be observed that herein the positive geared connection between the indicating shaft 2 and the driving shaft 66 be neutralized. This is accomplished as follows: Incidental to establishing a connection between the resetting knob 100 and the shafts 2 and 61, the conical cam member 103 is moved into the operature of the boss 87, engages the rounded end of shaft 4 and moves the same axially to the left, as viewed in Figures 2 and 4. Such motion is resisted by means of a spring 78 which is seated against a U-shaped supporting bracket 77, mounted upon a center plate 46. A collar 67² is pinned to the shaft 4 and takes the reaction of spring 78. A clutch hub 80 and a clutch collar 81 are loosely mounted upon the shaft 4 and urged against collar 67² by means of a spring 82 the other end of which is seated against a clutch hub 84 which is pressed by spring 82 against an adjacent collar 85 fixed to shaft 4. A clutch assembly 86, secured to the back plate 93 (Figure 4) engages clutch hub 84 to prevent its rotation in a clockwise direction (Figure 17) during the engagement. A gear 83 is secured to hub 84 and engages gear 48 to prevent rotation thereof in a counterclockwise direction (Figure 17). Gear 48 also engages the teeth of the differential holding gear 55, being rotatably mounted on the main shaft 2 and formed with a hardened steel hub 48' which serves as a clutch collar. Gear 47 carries a ball clutch assembly 47' (Figures 2 and 16) which engages with the hub 48' of gear 48 and permits the same to ride freely when gear 47 turns in a clockwise direction, as viewed in Figure 16 (the direction required for an indication), but is seized by the ball clutch when the direction of rotation of gear 47 is reversed during the operation of resetting. At this time gears 47 and 48 rotate together. The rotation of gears 47 and 48 together causes gear 55 to rotate the planetary pinions 58, 58³ and 58', 58² about sun pinions 56 and 57, respectively. This planetary drive of the pinions neutralizes the drive of these planetary pinions from gear 47 through gears 53 and sun pinion 56 with the result that the sun pinion 57 and shaft 9 have absolutely no torque exerted thereon during resetting, the tendency of pinions 58', 58² to drive sun pinion 57 in one direction by reason of the drive from shaft 3 being exactly offset by an equal tendency of the pinions to drive 57 in an opposite direction due to their planetary movement.

The ball clutch 41 fast to the center plate 46 (Figure 4) when engaged with the clutch hub 80, on which the gear 79 is secured, holds the gear 79 against rotation in a clockwise direction (Fig. 15). Gear 79 meshes with gear 40 (Figures 2 and 15) which is fast upon a hub of sun pinion 39. Pinion 39 further has a cylindrical sleeve portion which is engaged by ball clutch assembly 13 mounted upon plate 46, this ball clutch permanently holding the sun pinion 39 and gear 40 against rotation in the direction in which planetary pinion 32 tends to rotate gear 39 during the indicating operation.

It will thus be seen that the sun pinion 39 (which produces a twenty to one reduction between shaft 2 and quill 23) is normally positively locked against rotation in either direction inasmuch as the clutch assembly 13 prevents rotation in a clockwise direction and the clutch assembly 41 engaging the clutch hub 80 prevents rotation in a counterclockwise direction by preventing clockwise rotation of the meshing gear 79.

The purpose of the construction last described is to preclude movement of the driving train or indicating hands except as transmitted through the shaft 66 from the external power source, for visual evidence of meter performance, or from the reset knob 100 and then in a resetting direction only.

When shaft 4 is moved to the left, as viewed in Figure 4, the engagement of clutch 41 is shifted from the hub 80 to the free running clutch collar 81. This movement renders the clutch inoperative, for the time being, in relation to gear 79 and permits rotation of gear 39 in a counterclockwise direction (Figure 15) to permit the resetting operation.

During the resetting phase of operation the sun pinion 39 remains stationary until in the reverse rotation of the shaft 2 and the spider 30 the pawl 34 carried by the latter is moved into engagement with the single tooth formed in disc 11, secured to quill 23 (Figures 2, 10, 11 and 14), and through the engagement and continued reverse rotation causes the quill 23 and sun pinion 39 to be moved in unison with shaft 2 until detent 75 engaging the V-shaped wall 15 of notch 113 halts the operation with indicating hands at zero reading as previously described in dealing with the justifying mechanism. During the resetting operation the gear 39 is driven through its engagement with the planetary pinion 32 and moves freely in this condition as described above.

Furthermore, during the resetting operation, the planetary pinions 58, 58', 58² and 58³ partake of planetary movement about the sun pinions 56 and 57 because of the releasing of gear 48 for rotation as a result of the disengagement of clutch hub 84 from clutch 86 when shaft 4 is shifted to the left (Figure 4) during the resetting operation. Conversely, during indicating operation, the clutch 86 holds gear 83 and locking gear 48 against movement in the direction that gear plate 55 tends to turn them, thus holding the planetary pinions 58 against planetary movement and causing them to transmit the motion of shaft 9 to shaft 3 in reversed direction.

Reviewing the operation of the mechanism described above, the indicating phase of operation of the register is effected by movement of power shaft 66, transmitted to shaft 9 through mitre gears 51² and 51³. Shaft 9 drives jack shaft 3 in a reverse direction through planetary pinions 58, 58', 58² and 58³ (Figures 12 and 13) which are pivotally mounted in and between gear 55 and plate 59, sun pinions 56 and 57 on the respective shafts 3 and 9 engaging with the planetary pinions to effect the drive. Rotation of shaft 3 is transmitted to main shaft 2 through gears 53 and 47, mounted upon the respective shafts. The direction of rotation of the various shafts during an indicating operation is indicated by arrows in Figures 2 and 2a, it being understood that during resetting the shafts rotate in a direction reverse to that indicated by the arrows in these figures with the exception of shafts 9 and 66 which remain stationary. The arrows shown in Figures 14 and 16 indicate the direction of rotation of the respective parts during a registering operation, while those shown in Figures 15 and 17 indicate the direction in which the parts tend to rotate during such a registering operation. Shaft 2 serves as a mounting for the units hand 18 of the mechanism and also carries a spider 30 in an arm of which is journaled a shaft 33 to which planetary pinions 31 and 32 are fixed. Planetary pinion 32 engages sun gear 39 which has a different number of teeth corresponding to the ratio of speeds of the units and multiples indicating hands, thus causing planetary pinion 31, which engages a gear 29 upon quill 23, to transmit a desired speed to the quill 23. The units hand of the subordinate movement is driven from the mitre gear 51 on shaft 2 and mitre gears 51⁴ and 51' through shaft 61 and coupling member 63, while the multiples hand of the subordinate movement is driven from a gear 25 mounted upon the quill 23 of the principal movement and driving gear 88 upon jack shaft 5 through an idle gear 52 (Figure 1). Jack shaft 5 (Figure 5) extends rearwardly and drives the subordinate movement through a coupling member 63', gear 89, and gear 74 which is mounted upon the quill 73 (Figures 7 and 18).

In order that the foregoing construction may be operative, it will be seen that both sun gear 39 and gear 55 must be anchored during an indicating operation against movement by the forces acting on them during such an operation. Gear 40, which is integral with gear 39, is anchored against rotation in the direction indicated by the arrow in Figure 15 (the direction in which shaft 9 tends to rotate it during an indicating operation) by clutch 13. Gear 55 is also anchored against movement in a clockwise direction (Figure 17) (the direction in which shaft 9 tends to rotate it during an indicating operation) by gear 48 which is in turn anchored by gear 83 which is normally held against movement in a clockwise direction (Figure 17) by the clutch assembly 86 (Figure 4) mounted upon the back plate 93. The direction in which shaft 9 tends to rotate the train of gears 55, 48 and 83 during counting is indicated by arrows on Figure 17, and it will be evident from this figure that the clutch 86 fixed to back plate 93 will lock the hub 84 of the gear 83 and prevent such rotation as long as shaft 4 remains in its normal position shown in Figure 4. Gear 48 is formed with a clutch hub 48', as previously described and this hub is centered in the ball clutch 47' secured to gear 47. This clutch permits gear 48 to remain stationary during the indicating operation of shaft 2 which is required by clutch 86, as above explained. Clutch 47', however, seizes hub of gear 48 upon the reversal of motion of shaft 2, as occurs during the resetting operation, and then gears 47 and 48 revolve as a unit with gear 48 driving gear 55 to impart planetary movement to the planetary pinions 58, 58', 58² and 58³ at proper speed relative to the simultaneous drive of sun pinion 56 by gear 47 through shaft 3 and gear 53 to thereby cancel all torque exerted on shaft 9. Shaft 9 is at all times in positive engagement with shaft 3. However, during resetting operation of the resultant of rotative resetting forces acting upon shaft 9 is zero and it is therefore in static equilibrium and it remains stationary.

The resetting phase of operation which is effected by means of the manual knob 100 is accomplished by the application of forces from the shaft 98 directly to the shafts 2 and 61 through mitre gear 51⁴ and sliding gear 101 which engage gear 105, fixed to rotate with mitre gear 51⁴. Inasmuch as there is a positive mechanical connection between the driving shaft 66 and the main indicating shaft 2 this positive mechanical connection is herein neutralized when resetting. This is accomplished through the medium of the differential mechanism (Figures 2 and 12), as described above where it is shown that a positive mechanical connection is maintained between the drive shaft 66 and the indicating shaft 2 during the resetting operation with the drive shaft remaining free from rotation due to resetting and under no torque. Such condition is effected upon axial movement of shaft 98 to engage sliding gear 101 with gear 105. Inasmuch as the conical cam member 103 (Figure 3) engages the rounded end of shaft 4 to move the same to the left as viewed in Figure 4, such axial motion renders ineffective the clutch assemblies 41 and 86 which prevent the rotation of the gears 79 and 83 in a clockwise direction as viewed in Figures 15 and 17. The freely running gear 83 (after shaft 4 is moved to the left) permits gears 47 and 48 to be turned simultaneously and thus the planetary pinions 58, 58', 58² and 58³ are given planetary rotation to prevent the transmission of movement from shaft 3 to shaft 9. The freely running gear 79 (after shaft 4 has been moved to the left) permits sun pinion 39 to rotate upon engagement of pawl 34 with the tooth of disc 11 (Figure 14). The shaft 2 and quill 23 are thus moved until a zero position is reached at which time detent 75 engages the stop notch 113 and further movement is prevented. Clutch members 94 and 95 then permit continued motion of manual knob 100 in a resetting direction without transmitting the same to the resetting mechanism, thus preventing injury thereto.

A totalizer 68 (Figure 1) is driven by a worm wheel 69 which engages a worm 114 upon one end of a jack shaft 6 (Figure 6) which is journaled in dial case 14 and back plate 93 alongside jack shaft 3. Jack shaft 6 is driven by a gear 90 which is fixed to the other end of shaft 6 and is engaged by a gear 60 secured to shaft 9 adjacent the differential mechanism 12 (Figure 2). Inasmuch as the mechanism above described, including the differential mechanism 12 between the shafts 3 and 9, permits the shaft 9 to be stationary during the resetting operation, the totalizer is only actuated during an indicating operation.

With reference to Figures 19 and 20, the improved clamping mechanism by means of which the hands may be clamped to the supporting and actuating shafts is illustrated. This clamp is formed with a hub 115 having a split 116 formed therein between spaced flanges 117. A screw 118 is adapted to engage the flanges 117 and move the same together to secure the clamp to a shaft or quill upon which it is to be mounted. The hub 115 is further formed with a slot 119 within which an indicating hand is adapted to be received, the indicating hand thus being effectively spaced up on the shaft axially thereof and constrained to move rotatably with the shaft by the engagement of the hub of the indicating hand with the portion of the slot 119 adjacent the flanges 117.

It will be seen that the foregoing structure affords a positive and continually maintained mechanical connection between a gear fixed to the drive shaft and gears fixed to the indicator shaft 2 and quill 23 which connection is devoid of any friction clutches whatever in the driving train. As a result, the relative positions of the driving and driven members cannot possibly be affected by inertia effects or manipulative skill during any phase of an operation. Moreover, this positive coupling between the meter spindle or power shaft and the indicating hands is maintained at all times, even during resetting operation, without subjecting the meter spindle or power shaft to any resetting torque. Herein, the multiple indicating hands are also driven by a reverted epicyclic train at a positive angular velocity which depends solely upon the movement of the main shaft as transmitted through a planetary mesh gearing.

The justifying mechanism described herein affords a means for causing the indicating hands to be accurately positioned at each unit and multiple indicating position and the resetting mechanism is operated by a manual device which extends from the side of the register casing rather than projecting through the glass, coaxial with the dial. This enables the dial to be tightly closed at all times and prevents the entry of dirt and other foreign matter within the mechanism. These and other advantages of my improved construction will, however, be clearly apparent to those skilled in the art.

While the invention has been described with specific reference to the accompanying drawings, shown herein for illustrative purposes, it is not to be limited, save as defined in the appended claims.

I claim as my invention:

1. A register operating mechanism having a power shaft, an indicating element, a train of toothed gearing in continuously maintained positive operative relation with said power shaft and element to impart rotative movement of said power shaft positively to said indicating element, a differential gearing being included in the train, resetting means, and means to apply resetting force to the differential gearing to cause the power shaft to be passive.

2. A register operating mechanism having a power shaft, an indicator shaft, a positive driving train in continuously maintained operative relation to impart rotative movement of said power shaft to said indicator shaft, a differential gearing being included in the train, resetting means, and means operative only upon operation of said resetting means for maintaining said power shaft free from resetting torque during resetting.

3. A register operating mechanism having a drive shaft, indicating mechanism having a driving connection driven by said drive shaft, said connection including a differential mechanism having planetary gearing including a gear and planetary pinions mounted thereon, resetting means for said indicating mechanism, means to rotate said planetary gearing during resetting to prevent transmission of the resetting forces to the drive shaft, and means holding said gear stationary during an indicating operation.

4. A register operating mechanism having a power source, a drive shaft, a maintained positive connection therebetween, indicating mechanism, a driving connection between said indicating mechanism and said drive shaft and including a planetary gearing, means for maintaining said planetary gearing free from planetary movement during an indicating operation, resetting means for said indicating mechanism, and means operable simultaneously with said resetting means for effecting planetary movement of said planetary gearing and maintaining said drive shaft stationary during resetting.

5. A register operating mechanism having a power shaft, an indicator shaft, a continuously maintained positive driving train to give the indicator shaft movement of registration, a resetting means for rotating said indicator shaft during a resetting operation, a differential gearing being included in the driving train and itself including a plentary gearing with a gear on which are mounted planetary pinions, said last mentioned gear being stationary during an indicating operation, and means operable simultaneously with the resetting means to control the operation of said last mentioned gearing to prevent transmission of the resetting forces to the power shaft.

6. A register operating mechanism having a power shaft, an indicator shaft, a continuously maintained positive driving train to give the indicator shaft movement of registration, a differential gearing being included in the train and itself including a planetary gearing with a gear on which are mounted planetary pinions, a holding gear engaging the last named gear to hold the same against rotation normally, means to reset the indicator shaft, an axially movable shaft having a gear engaging the holding gear, a clutch on the axially movable shaft to prevent rotation of the holding gear in one direction, and means to move the last named shaft axially upon actuation of the resetting means to render the clutch inoperative.

7. A register operating mechanism having a power source, a power shaft, a maintained positive connection therebetween, an indicator shaft for actuating a register indicating element, means to maintain a positive geared connection between the shafts, a resetting shaft, means to effect driving relation between the resetting shaft and the indicator shaft, and means actuated by resetting rotation of the indicator shaft to neutralize resetting forces to the power shaft.

8. A register operating mechanism having a power shaft, an indicator shaft for actuating a register indicating element, means to maintain a positive geared connection between the shafts and including sun gears and planetary gearing, a resetting shaft, means to effect driving relation between the resetting shaft and the indicator shaft, a clutch shaft, a clutch operatively associated with said planetary gearing and arranged to hold said gearing against orbital movement during a registering operation, and means to move the clutch shaft axially to disengage said clutch upon actuation of the resetting means.

9. A register operating mechanism having a power shaft, an indicator shaft for actuating a register indicating element, a differential gearing driven by the power shaft, a jack shaft coaxial with the differential gearing and driven thereby, intermeshing gears between the jack shaft and the indicator shaft, a clutch on the gear of the indicator shaft, a gear engaging the differential gearing and coaxial with the indicator shaft, the last named gear having a hub engaged by the clutch, and means to hold the last named gear against movement with respect to the first gear mounted on the indicator shaft.

10. A register operating mechanism having a power shaft, an indicator shaft for actuating a register indicating element, a differential gearing driven by the power shaft, a jack shaft coaxial with the differential gearing and driven thereby, intermeshing gears between the jack shaft and the indicator shaft, a clutch on the gear of the indicator shaft, a gear engaging the differential gearing and coaxial with the indicator shaft, the last named gear having a hub engaged by the clutch, a gear engaging the last named gear, having a clutch associated therewith to prevent rotation thereof due to rotation of the indicator shaft during indicating motion, means for imparting rotative resetting movement to the indicator shaft, and means for releasing the last named clutch.

11. A register operating mechanism having a power shaft, an indicator shaft, means to transmit power from the power shaft to the indicator shaft, a quill concentric with the indicator shaft, operatively related planetary pinions mounted on the indicator shaft, a sun gear on the quill engaged by one of the planetary pinions, a sun gear mounted on and rotatable relative to the indicator shaft and engaged by the other of the planetary pinions and having a different number of teeth than the said pinion, means to hold the last named sun gear positively against rotation in one direction, resetting means for the indicator shaft and quill, a clutch shaft actuated by the resetting means, means controlling the rotation of said last named sun gear in another direction during indicating movement including a gear on the clutch shaft controlling the last named sun gear and a clutch engaging the gear on the clutch shaft, and means to disengage the clutch upon actuation of the clutch shaft.

12. A register operating mechanism having a power shaft, an indicator shaft, a quill journaled on the indicator shaft, a differential gearing between the power shaft and the indicator shaft, a differential gearing between the indicator shaft and the quill, means to anchor the first differential gearing normally against planetary movement, means to prevent normal movement of a sun gear of the second differential gearing, gears engaging the anchoring means and the last named means, means to prevent normal movement of the last named gears in one direction, resetting means for the indicator shaft and the quill, and means to release the means to prevent movement of the last named gears by the resetting means to release the first differential and the last named sun gear of the second differential for rotation in one direction.

13. A register operating mechanism having a power shaft, an indicator shaft, a quill journaled on the indicator shaft, a differential gearing between the power shaft and the indicator shaft, a differential gearing between the indicator shaft and the quill, means to anchor the first differential gearing normally against planetary movement, means to prevent normal movement of a sun gear of the second differential gearing, a clutch shaft having gears engaging the anchoring means and the last named means, clutches to prevent normal movement of the last named gears in one direction, resetting means for the indicator shaft and the quill, and means to actuate the clutch shaft by the resetting means to release the first differential and the last named sun gear of the second differential for rotation in one direction.

14. A register operating mechanism having a power shaft and a gear fixed thereto, an indicator shaft having a gear fixed thereto, a differential gear train between the gears on said power shaft and the indicator shaft, a resetting gear on the indicator shaft, a resetting shaft mounted for axial movement and rotation, a gear slidable and rotatable with the resetting shaft and adapted to drive the resetting gear, and manually operated means to move the resetting shaft.

15. A register operating mechanism having a power shaft and a gear fixed thereto, an indicator shaft having a gear fixed thereto, a differential gear train between the gears on said power shaft and the indicator shaft, a resetting gear on the indicator shaft in continuously maintained positive operative relation with the differential gear train, a resetting shaft mounted for axial movement and rotation, a gear mounted to rotate with the resetting gear, a gear slidable and rotatable with the resetting shaft to move into engagement with the last named gear, and manually operated means to move the resetting shaft.

16. A register operating mechanism having a power shaft, an indicator shaft, a differential gear train between the power shaft and the indicator shaft, a resetting gear on the indicator shaft in continuously maintained positive operative relation with the differential gear train, a resetting shaft mounted for axial movement and rotation, a gear slidable and rotatable with the resetting shaft to move into engagement with the last named gear, means to urge the resetting shaft and the gear thereon normally away from the last named gear, and a yielding connection between the resetting shaft and the gear mounted thereon.

17. A register operating mechanism having an indicator element, a differential gear train provided with planetary pinions, means to effect register indication in one rotational direction of said element, means to effect zero resetting in another rotational direction thereof, both of said operating means being maintained in positive operative connection with the gear train and with said element to constitute a unitary structure, and means to constrain said pinions to rotate during both the indicating and the resetting phases of operation.

18. A register operating mechanism having a power shaft and a gear fixed thereto, an indicator shaft having a gear fixed thereto, a drive train positively connecting said gears to effect register indication in one rotational direction on said indicator shaft, means to effect rotation of the indicator shaft for zero resetting in another rotational direction, and means to control the drive train to neutralize resetting forces to the power shaft.

19. A register operating mechanism having a power source, a power shaft in maintained positive connection with said power source, a gear fixed to said power shaft, an indicating shaft having a gear fixed thereto, a drive train positively connecting said gears to effect register indication in one rotational direction of said indicator shaft, means to effect rotation of the indicator shaft for zero resetting in another rotational direction, and means to control the drive train to neutralize resetting forces to the power shaft.

20. A register operating mechanism having an indicating mechanism and a drive therefor, a driving connection between the indicating mechanism and drive having cooperating elements both rotatable upon rotation of one of said elements to rotate said indicating mechanism during registering, resetting mechanism, and means operative by said resetting mechanism and rotating the other element of said connection during resetting for maintaining said drive stationary while maintaining the latter ready to resume operation during registering.

21. A register operating mechanism having an indicating mechanism and a drive therefor, a driving connection between the indicating mechanism and drive having cooperating elements and positive operative connections therebetween operative during registering to transmit a positive drive to said indicating mechanism and both rotatable upon rotation of one of said elements to rotate said indicating mechanism during registering, resetting mechanism, and means operative by said resetting mechanism and rotating the other element of said connection during resetting while maintaining said drive stationary and ready to resume operation during registering.

22. In a registering mechanism, indicating mechanism, driving mechanism therefor including a differential mechanism including driving and driven elements and a planetary element, resetting mechanism for moving said indicating mechanism to zero having a driving connection with the planetary element of said differential mechanism during resetting, and means other than said resetting mechanism and also operative by said resetting mechanism for freeing the driving element of said differential mechanism from rotation during resetting.

23. A register operating mechanism having a drive shaft, indicating mechanism having an operative connection with said drive shaft including a differential mechanism, resetting means for said indicating mechanism, and mechanism for preventing the rotation of said drive shaft due to resetting torque including means operative by said resetting means for neutralizing the resetting force in said differential mechanism.

24. A register operating mechanism having a power source, a power shaft in maintained positive connection with said power source, indicating mechanism, a continuously maintained positive operative connection between said power shaft and indicating mechanism and including a differential mechanism, resetting means for said indicating mechanism, and mechanism for preventing the rotation of said power shaft due to resetting torque including means operative by said resetting means for neutralizing the resetting force in said differential mechanism.

25. A register operating mechanism including a drive shaft, a driven shaft, a differential gearing connecting said shafts including a sun gear on each of said shafts, a planetary supporting gear, planetary pinions carried on said supporting gear and meshing with said sun gears, means to anchor said supporting gear during an indicating operation, resetting means including an element having an operative connection with said driven shaft simultaneously applying resetting force on said driven shaft and said supporting gear to rotate the same in unison, whereby to neutralize the resetting force in said differential gearing and maintain said driving shaft free from rotation by said resetting means during resetting.

26. A register operating mechanism having a drive shaft, a driven shaft, a differential gearing including a sun gear on each of said shafts, an indicating shaft driven from one of said sun gears, and resetting means for rotating said driven shaft during resetting of said indicating shaft while maintaining said other sun gear free from rotation by said resetting means.

GEORGE H. HENRIETTA.